US012805516B2

(12) United States Patent
Beltrán Aznar

(10) Patent No.: US 12,805,516 B2
(45) Date of Patent: Nov. 24, 2026

(54) BIOCIDAL PRODUCT WITH LUMINESCENT MARKER ADDITIVE FOR TEXTILE SURFACES OR THE LIKE

(71) Applicant: ANCOR TECNOLÓGICA CANARIA, S.L., Las Palmas de Gran Canaria (ES)

(72) Inventor: Noelia Beltrán Aznar, Las Palmas de Gran Canaria (ES)

(73) Assignee: ANCOR TECNOLÓGICA CANARIA, S.L., Las Palmas de Gran Canaria (ES)

( * ) Notice: Subject to any disclaimer, the term of this patent is extended or adjusted under 35 U.S.C. 154(b) by 250 days.

(21) Appl. No.: 18/847,070

(22) PCT Filed: Mar. 15, 2023

(86) PCT No.: PCT/ES2023/070156

§ 371 (c)(1),
(2) Date: Sep. 13, 2024

(87) PCT Pub. No.: WO2023/175222

PCT Pub. Date: Sep. 21, 2023

(65) Prior Publication Data

US 2025/0221404 A1 Jul. 10, 2025

(30) Foreign Application Priority Data

Mar. 18, 2022 (ES) ................................ ES202230232

(51) Int. Cl.

| | |
|---|---|
| ***A01N 33/12*** | (2006.01) |
| ***A01N 25/10*** | (2006.01) |
| ***A01N 31/02*** | (2006.01) |
| ***A01N 47/28*** | (2006.01) |
| ***A01N 55/00*** | (2006.01) |

(52) U.S. Cl.

CPC ............ *A01N 25/10* (2013.01); *A01N 31/02* (2013.01); *A01N 33/12* (2013.01); *A01N 47/28* (2013.01); *A01N 55/00* (2013.01)

(58) Field of Classification Search

CPC ........ A01N 31/00; A01N 31/02; A01N 31/14; A01N 33/00; A01N 33/02; A01N 33/12

See application file for complete search history.

(56) References Cited

U.S. PATENT DOCUMENTS 10,544,520 B2 1/2020 Tang et al.

FOREIGN PATENT DOCUMENTS

| | | | |
|---|---|---|---|
| CN | 1948606 | A | 4/2007 |
| CN | 102515550 | A | 6/2012 |
| CN | 106012510 | A | 10/2016 |
| CN | 107955987 | A | 4/2018 |
| CN | 108384536 | A | 8/2018 |

OTHER PUBLICATIONS

International Search Report for Corresponding International Application No. PCT/ES2023/070156, mailed May 5, 2023, with English Translation, 9 pages.

*Primary Examiner* — Micah Paul Young

(74) *Attorney, Agent, or Firm* — LUCAS & MERCANTI, LLP

(57) ABSTRACT

A biocidal product for application to surfaces, particularly porous surfaces such as fabrics, textiles and the like, incorporating an identification marker which makes it possible to certify the presence of the product and therefore that protection is kept. This biocidal composition includes an ester vinyl resin between 0.01 and 0.05% with respect to the total weight of the product, which acts as a carrier for the biocidal agents, a mixture formed by the combination of between 0.1 and 2.0% dimethyl didecyl ammonium chloride and between 2.0 and 10.0% dimethyloctadecyl[3-(trimethoxysilyl)propyl] ammonium chloride in a medium formed by the mixture of 0.2 to 1.0 methanol and 0.02 and 1.50 ethanol, urea in a proportion between 0.2 and 1.0% and acetic acid between 0.001 and 0.010; and the luminescent additive incorporates aluminosilicate metallic oxides containing rare earth ions by way of doping agents.

6 Claims, No Drawings

BIOCIDAL PRODUCT WITH LUMINESCENT MARKER ADDITIVE FOR TEXTILE SURFACES OR THE LIKE

CROSS-REFERENCE TO RELATED APPLICATION

This application is a 371 of PCT/ES2023/070156, filed Mar. 15, 2023, which claims the benefit of priority from Spanish Patent Application No. P202230232, filed Mar. 18, 2022, the contents of each of which are incorporated herein by reference.

OBJECT OF THE INVENTION

The present invention discloses a biocidal product for application to any porous surface, particularly textile surfaces, incorporating an additive which allows the presence thereof to be identified by means of a luminescent effect, such that it ensures that the surface has been previously treated with said biocidal product, which allows providing confidence to the user and ensuring that the product is present.

BACKGROUND OF THE INVENTION

Antimicrobial treatment of materials is becoming an increasingly desirable mechanism to combat microbial pathogens. Microbial contamination of porous materials, such as fibres and fabrics, can be particularly difficult to block since the material itself can protect the microorganisms from surface sterilisation methods. It is also important to develop materials having intrinsic antimicrobial properties that can prevent or reduce contamination over a period of time.

In the past, fibre, woven and non-woven fabrics and similar materials such as cotton balls, sponges or wipes were combined with solvents to achieve microbial elimination, microbicidal or static growth. Antibody structures have also been used in fibres or fabrics for such purposes. Although all these have useful physical attributes, there is, however, a substantial need to obtain biocidal compositions which exhibit substantially improved microbial capture, microbial microbicidal or static microbial growth characteristics. There is a great need in the art to eliminate harmful microbial population from textile surfaces, but with little or no risk of re-contamination or re-deposition of the wipe. In this way, the immobilisation of microbe on the fibre is required.

European patent application EP3933102 relates to a flat textile structure having a woven and/or non-woven fabric, the woven and/or non-woven fabric having fibres optionally having at least partially a coating, with a dye, which is antimicromagnetic when activated with electromagnetic radiation, bonded to the fibres or in the coating. The invention also relates to clothing made from the textile fabric, processes for producing or functionalising a textile fabric, and uses of a photosensitiser bonded to a textile fabric.

U.S. Pat. No. 10,058,099 provides methods and materials for decontamination of surfaces and fabrics, such as non-woven fabrics, that are contaminated with infestations of microorganisms such as bacteria. Biocidal oligomers having conjugated oligo-(aryl/heteroaryl ethynyl) structures and comprising at least one cationic group can be used to decontaminate infested surfaces in the presence of oxygen and, optionally, illumination. Fibres incorporating biocidal oligomers having conjugated oligo-(aryl/heteroaryl ethynyl) structures and comprising at least one cationic group, in which the oligomer is physically associated with or covalently bonded to, or both, the fibre-forming polymer can be used to form non-woven mats. Unfortunately, these materials do not allow the biocidal product to remain safely adhered to the textile surface for an unlimited time.

There are many biocidal products in the art which allow protecting different surfaces, however, there is a need for a biocidal product which acts indefinitely and which the user finds to be safe and provide the certainty that the surface is protected by means of a luminescent identifying label.

Certain triazines are known to be active when exposed to ultraviolet light. For example, U.S. Pat. No. 3,167,565 describes an organic triazine compound useful as an optical brightener that supposed has affinity for binding to fibrous substrates including cellulose, nylon and wool. Other triazine compounds are also known to be active when exposed to UV light, but these compounds are characterised notably as UV absorbers, in other words, compounds that absorb light in the ultraviolet region of the electromagnetic spectrum, but do not re-emit the energy absorbed as visible light. The general structure of a UV absorber molecule allows it to absorb a broad spectrum of high-energy ultraviolet rays and to then release the energy absorbed as lower-energy rays (generally, at a non-specific wavelength or at a wavelength outside the visible band).

Lastly, there is a need to highlight US patent application US20110268896 which describes a composition comprising an organic fluorophore or a derivative thereof; as well as articles of manufacture labelled with the fluorophore and methods for labelling articles with the fluorophore and methods for producing a fluorescent fibre.

The present invention discloses a transparent biocidal product which allows protecting surfaces, particularly those porous surfaces such as textiles or the like, furthermore, the protection can be detected by means of infrared radiation. This product ensures permanent and safe antimicrobial protection of surfaces on which it is applied, certifying its antimicrobial protective effect. Therefore, the application thereof represents a safe alternative for the surface protection of all types of textile materials, eliminating the need for continuous disinfection and thereby achieving a very significant reduction in the consumption of chemicals, with the savings and sustainability that it entails.

The biocidal product of the present invention is intended for application particularly in the healthcare sectors in which textile materials are used continuously. Since healthcare spaces are exposed to pathogenic agents, they are highly susceptible of becoming a large reservoir for said pathogenic agents, which increases possible infections both among patients and among healthcare workers in these areas. Currently, due to the short-lived effect of disinfectants, there is no way of knowing if the treated surfaces are contaminated again and it is not possible to guarantee when they will be contaminated again until the next cleaning is performed. The application of the product provides a guarantee of disinfection since its presence and, therefore, its continuous disinfecting action 24 hours a day, 7 days a week, can be detected. The product is a combination of biocidal resins based on water-based vinyl ester, quaternary ammoniums and ionic silver to give it antimicrobial capabilities. Furthermore, the luminescent character of the materials doped with luminescent "rare earth" ions present very significant advantages with respect to the state of the art and exhibit, compared to standard fluorescent dyes, invisibility to ambient light and activation by low-cost commercial infrared light by means of the conversion of this invisible reading light into visible emission of the product. Furthermore, "rare earth" elements (lanthanides) exhibit sharp emission peaks, long fluorescence lifetime, low long-term toxicity and high chemical photostability and ease of handling, making them an excellent option for a variety of optical security applications.

PREFERRED EMBODIMENT OF THE INVENTION

The present invention discloses a biocidal product for application to surfaces, particularly those hard porous surfaces, such as fabrics or the like incorporating an identification marker which makes it possible to certify the presence of the product and therefore allows indicating that it maintains the protection.

First, the biocidal product and the added marker additive must be stable in the mixture and keep the additive dispersed in the biocidal composition when it is applied to porous surfaces, such that they maintain the antimicrobial and luminescent properties and at the same time allow them to act together.

The biocidal product is formed by mixing a biocidal composition and a luminescent additive dispersed therein, wherein the biocidal composition is formed by adding to deionised water an ester vinyl resin between 0.01 and 0.05% with respect to the total weight of the product, which acts as a carrier for the biocidal agents, and a mixture formed by the combination of between 0.1 and 2.0% dimethyl didecyl ammonium chloride and between 2.0 and 10.0% dimethyloctadecyl[3-(trimethoxysilyl)propyl] ammonium chloride, which act by way of biocide in a medium formed by the mixture of 0.2 to 1.0 methanol and 0.02 and 1.50 ethanol. Additionally, urea is added in a proportion between 0.2 and 1.0% and acetic acid between 0.001 and 0.010 to adjust the pH of the resulting solution.

A silver ion solution preferably formed by silver phosphate glass is added to this resulting mixture in a proportion between 0.3 and 3.0%, providing it with an additional antibacterial effect additional and allowing it to adhere to hard non-porous surfaces, as a result of the structural properties of the silver phosphate glass.

Vinyl ester resin is compatible with all fabrics, pigments, and fillers and allows the biocidal product to adhere to any porous surface to be treated, particularly textile surfaces. These vinyl ester resins provide superior chemical and physical resistance, increasing even more if a thermal post-curing is performed at more than 100° C. It is a resin that is highly resistant to weather conditions (temperature and humidity), withstanding the most severe and demanding conditions. The short gel-curing interval reduces visible fibre marking on the surface and reduces shrinkage stress. They allow thermal post-curing, exhibit greater elongation at break, do not shrink after hardening and do not absorb water. Therefore, it is special for application on textile surfaces, fabrics, etc.

Dimethyl didecyl ammonium chloride is an effective biocide against bacteria, being in turn superior to benzalkonium chloride for killing bacteria that already have chemical resistance, furthermore, it has an excellent emulsifying effect and a good solubility which allows the mixture to be stable in a wide range of temperatures and to be used in the present product in the medium in which the luminescent additives acting as markers can be dispersed.

Dimethyloctadecyl(3-trimethoxysilylpropyl) ammonium chloride is a disinfectant that is used as a preservative and fungicide and can be used as a siloxane coupling agent. As a cationic quaternary ammonium salt, it will be completely ionised in aqueous solution. The resulting product formed by dimethyloctadecyl(3-trimethoxysilylpropyl) ammonium chloride can be used as a preservation treatment for particular materials such as those used in human clothing and bedding, carpets and upholstery.

Silver ion solution preferably formed by silver phosphate glass is soluble materials which can act as a unique system for supplying silver ions in a controlled manner. The ions are incorporated into the glass structure and are not a separate phase; therefore, its release rate is defined by the overall degradation rate of the glass. Phosphate-based glasses show that the release of an optimal amount of silver ions from silver-doped phosphate-based glasses can cause a significant reduction in bacterial growth on surfaces. Although high concentrations of free silver ions are required for bactericidal action against surfaces, it is very important not to sacrifice any cyto/biocompatibility aspect of the material while maintaining an effective antimicrobial effect. The amount of silver released from the silver-doped glasses under research is well below the levels that are cytotoxic to human cells.

Urea is used as a cross-linking agent for washing textiles treated with the biocidal product of the invention, it also prevents the wear of the fabric, it is mainly applied to fibres and finishes, being resistant to cotton, viscose and cloth or knitted fabric mixture.

This biocidal composition allows continuous disinfection action 24 hours a day, 7 days a week. The coating formed by this biocidal composition allows achieving, with a thickness between 10 and 30 micrometres, a reduction equal to or greater than 99.0% in the growth of virus, bacteria and fungi with a minimum duration of 1 year on the porous surfaces treated by means of a single application.

The incorporation into the biocidal composition of metallic oxides (aluminosilicate glass containing rare earth ions by way of doping agents) allows a coating of said composition to be detected and identified by means of infrared light that induces an easily detectable luminescence (green light). This luminous additive exhibits a pattern of emitted light that allows the compound to be unforgeably coded, which distinguish the same with respect to other similar products on the market.

State-of-the-art anti-counterfeiting technologies are experiencing growing and constant global demand in fields such as fight against product counterfeiting. In this sense, high-security anti-counterfeiting labels with luminescent materials are at the forefront of the latest encryption technologies based on recognition of encoded luminescent patterns. Specifically, the materials doped with luminescent "rare earth" ions present very significant advantages compared to standard fluorescent dyes: invisibility to ambient light and activation by low-cost commercial infrared light by means of the conversion of this invisible reading light into visible emission of the product. Furthermore, "rare earth" elements (lanthanides) exhibit sharp emission peaks, long fluorescence lifetime, low long-term toxicity and high chemical photostability and ease of handling, making them an excellent option for a variety of optical security applications. Once the biocidal mixture is prepared, the luminescent additive is dispersed in said previously prepared biocidal composition, adding between 0.03 and 2.5% of the luminescent additive in deionised water with respect to the total weight of the product, such that the proportion of deionised water in the final biocidal product is between 78.44 and 97.134%.

The luminescent additive that acts as a marker allowing the identification of the biocide composition is made up of between 20 and 30% silica gel in combination with alumina gel in a proportion between 10 and 30% and calcium fluoride between 30 and 50% by weight. Materials doped with luminescent "rare earth" ions, such as between 0.5 and 3% erbium (III) fluoride, between 5 and 15% ytterbium (III) fluoride, a maximum of 5% thulium (III) fluoride, and a maximum of 1% europium (III) fluoride, are added to this mixture. These percentages are with respect to the total % of the luminescent additive.

The method of preparing the luminescent additive is performed from oxides and fluorides that have been described in detail by means of melting in a furnace between 1200 and 1500° C. for about 40 minutes. The melt is laminated by means of laminating rollers in order to facilitate cooling and subsequent grinding. The laminated melt is cut into pieces and left to cool to room temperature. It is then ground in a hammer mill until achieving a particle size distribution approximately equal to D10<1 micrometre; D50<5 micrometres; D90<15 micrometres.

Once all the materials for the production of the biocidal product have been added, stirring is maintained for 30 minutes at room temperature and with a speed not exceeding 2500 rpm. Once stirring is completed, the mixing tank is emptied and the material ready to be applied is packaged.

Silica gel is used as a cold light coating, i.e., it does not involve heat production, being particularly useful in the main physical phenomena that allow the production of light with characteristics such as phosphorescence and fluorescence. Furthermore, it is used as an insulating coating, forming a thin layer on the application surface similar to a laminate, protecting and preserving a surface from the action of water, from scratches or other abrasion damage. Alumina acts as a selective adsorbent allowing the level of fluoride in the mixture to be adjusted downward.

Calcium fluoride doped with luminescent "rare earth" ions significantly increases its fluorescence with broad emission that appears within the range of acceptable targets. Erbium fluoride increases the transmission of infrared light and of the remaining luminescent materials in the marker composition. Erbium-doped silica glass fibres are the active element to amplify the luminescent effect, in addition, their homogenisation increases due to the presence of alumina. Ytterbium fluoride also increases the amplification of the material as a luminescent marker and thulium (III) fluoride is used to improve infrared emission and to improve up-conversion fluorescence to ultraviolet and visible in fluorinated glasses. The fluorescence of europium is used to improve the effect of the marker additive.

The different tests have determined that the luminescent additive of the product presents emission only under invisible infrared light (frequency of about 980 nm) with a high intensity brightness, due to the lack of background noise due to the zero autofluorescence of the textile substrate or the surface where it has been applied. Additionally, the luminescence intensity ratios between the different visible emission bands (blue, green and red) observed after the conversion of the invisible infrared reading light, can be tuned on demand (by modifying the concentration level and type of doping "rare earth" ions). In other words, encoding the emitted light using an unforgeable code, by being designed and synthesised on demand at source, providing a novel and disruptive proof of concept for security patterns with light encryption.

The resulting biocidal product is colourless and will be applied in a nebuliser format and it is spread over the surface to be protected with the help of a microfibre cloth. To determine the thickness to be applied to the wet surface, a precision wet film comb is used, which as a result of its "teeth" allows determining the range of the applied wet film. Dry thickness will be verified using the electronic device, Positector 6000, which by means of its galvanic cell, being positioned on a ferrous surface, returns its thickness digitally.

To determine the effectiveness of this biocidal coating on different microorganisms, the following tests have been performed:

UNE-EN ISO 14476 Chemical disinfectants and antiseptics—Quantitative suspension test for the evaluation of virucidal activity in the medical area.

UNE-EN ISO 20743 Textiles—Determination of antibacterial activity of textile products.

UNE-EN ISO 18184—Test methods for the determination of the antiviral activity of products against specific viruses.

A biocidal surface protection of between 12 and 18 months, allowing hard non-porous surfaces to be kept protected for a long time with a single application, has been determined. The product is effective for the biocidal protection of various porous surfaces, particularly textiles, against various microorganisms such as *Escherichia coli, Staphylococcus aureus, Enterococcus hirae, Pseudomonas aeruginosa, Candida albicans*, as well as certain types of virus with and without an external envelope.

As an added value, the luminescent feature thereof clearly distinguishes the present invention with respect to the state of the art, since it allows the user to visualise where the product has been applied and recognise an encoded light pattern to demonstrate that the product is authentic. With a simple and compact portable hand-held device (pocket spectrometer) it will allow the end user, illuminating with a low-cost commercial infrared laser pointer, to detect the custom-encoded, unforgeable luminescent pattern, and therefore to verify that the applied product is protected with the biocidal composition. This luminescence technology with infrared light and colour encoding using "rare earth" ions is at the forefront of anti-counterfeiting light technology, along the lines of techniques used in the authentication of documents (passports, security inks) and in security encryption for legal tender banknotes. Therefore, its use in the original identification of the biocide product constitutes without a doubt an absolute novelty that defines a clear substantial difference with other products having similar features on the market. The biocide product is formulated in an aqueous base, so good drying times, ranging from 2 to 3 minutes, are obtained. This product is easy to apply. Using a nebuliser, it allows effective application on the surface with the help of a cloth.

The invention claimed is:

1. A biocidal product with luminescent marker additive for textile surfaces or the like, wherein the biocidal product is formed by mixing a biocidal composition and a luminescent additive dispersed therein, wherein the biocidal composition is formed by adding to deionised water an ester vinyl resin between 0.01 and 0.05% with respect to the total weight of the product, which acts as a carrier for the biocidal agents, and a mixture formed by the combination of between 0.1 and 2.0% dimethyl didecyl ammonium chloride and between 2.0 and 10.0% dimethyloctadecyl[3-(trimethoxysilyl) propyl] ammonium chloride, which act by way of biocide in a medium formed by the mixture of 0.2 to 1.0% methanol and 0.02 and 1.50% ethanol, urea in a proportion between 0.2 and 1.0% and acetic acid between 0.001 and 0.010%, and the luminescent additive in deionised water in a proportion between 0.03 and 2.5% with respect to the total weight of the biocidal product and comprising between 20 and 30% silica gel in combination with alumina gel in a proportion between 10 and 30%; between 30 and 50% by weight of calcium fluoride, and a mixture of materials doped with luminescent “rare earth” ions, comprising between 0.5 and 3% erbium (III) fluoride, between 5 and 15% ytterbium (III) fluoride, a maximum of 5% thulium (III) fluoride, and a maximum of 1% europium (III) fluoride, and wherein the proportion of deionised water in the final biocidal product is between 78.44 and 97.134%.

2. The biocidal product with luminescent marker additive for textile surfaces or the like according to claim 1, wherein the method of preparing the luminescent additive is performed from oxides and fluorides by means of melting in a furnace between 120° and 1500° C. for about 40 minutes.

3. The biocidal product with luminescent marker additive for textile surfaces or the like according to claim 1, wherein the melted luminescent additive is laminated, cut into pieces and left to cool to room temperature.

4. The biocidal product with luminescent marker additive for textile surfaces or the like according to claim 1, wherein the luminescent additive is ground until achieving a particle size distribution approximately equal to D10<1 micrometre.

5. The biocidal product with luminescent marker additive for textile surfaces or the like according to claim 1, wherein the luminescent additive is ground until achieving a particle size distribution approximately equal to D50<5 micrometres.

6. The biocidal product with luminescent marker additive for textile surfaces or the like according to claim 1, wherein the luminescent additive is ground until achieving a particle size distribution approximately equal to D90<15 micrometres.

* * * * *